United States Patent [19]

Clark

[11] Patent Number: 5,678,878
[45] Date of Patent: Oct. 21, 1997

[54] HEAT BLOCKER SYSTEM AND METHOD

[76] Inventor: Rickey Dale Clark, 312 19th St., Galveston, Tex. 77550

[21] Appl. No.: 517,839

[22] Filed: Aug. 20, 1995

[51] Int. Cl.⁶ .................... B60J 1/20; B60R 13/08
[52] U.S. Cl. .................... 296/95.1; 296/211; 150/168
[58] Field of Search .................... 296/95.1, 136, 296/211; 150/166, 168

[56] References Cited

U.S. PATENT DOCUMENTS

| | | | |
|---|---|---|---|
| 3,687,401 | 8/1972 | Moore | 244/119 |
| 3,815,307 | 6/1974 | Tantlinger | 296/211 X |
| 3,944,008 | 3/1976 | Moore | 180/21 |
| 4,002,367 | 1/1977 | Thomas | 296/211 |
| 4,135,882 | 1/1979 | Harkness et al. | 422/133 |
| 4,646,499 | 3/1987 | Wilson | 296/211 X |
| 4,671,558 | 6/1987 | Cline | 296/97.7 |
| 4,726,406 | 2/1988 | Weatherspoon | 296/95.1 X |
| 4,751,115 | 6/1988 | Smith et al. | 428/12 |
| 4,759,581 | 7/1988 | McNamee | 296/97.7 |
| 4,762,358 | 8/1988 | Levosky et al. | 296/97.7 |
| 4,777,994 | 10/1988 | Nederveld | 160/84.04 |
| 4,790,591 | 12/1988 | Miller | 160/370.21 |
| 4,840,832 | 6/1989 | Weinle et al. | 428/156 |
| 4,903,748 | 2/1990 | Foraker | 296/95.1 X |
| 4,998,768 | 3/1991 | Wu | 296/136 |
| 5,007,976 | 4/1991 | Satterfield et al. | 156/222 |
| 5,016,934 | 5/1991 | Pelz | 296/214 |
| 5,082,716 | 1/1992 | Satterfield et al. | 428/175 |
| 5,083,834 | 1/1992 | Moffatt et al. | 296/190 |
| 5,096,517 | 3/1992 | Comert et al. | 156/79 |
| 5,101,643 | 4/1992 | Hicke | 62/407 |
| 5,123,468 | 6/1992 | Mater, Jr. | 296/95.1 X |
| 5,252,617 | 10/1993 | Werner et al. | 521/56 |
| 5,328,230 | 7/1994 | Curchod | 296/136 |
| 5,356,191 | 10/1994 | Sheeham | 296/95.1 |
| 5,382,068 | 1/1995 | Simmons et al. | 296/24.1 |

*Primary Examiner*—Andrew C. Pike
*Attorney, Agent, or Firm*—Kenneth L. Nash

[57] ABSTRACT

Heat blocker system and methods are provided for preventing heat flow into the passenger compartment (118) of a vehicle (10) to reduce a heat buildup therein. A hole (12) may be formed in the door jamb region (16) or other convenient place that is not visible. A tubular insertion member (66) may then be inserted through the hole (12) to an exterior panel cavity (26). Insulation material (68), such as liquid polyurethane resin or other suitable materials, is injected into the panel cavity (26) and allowed to expand and harden. The hole (12) is then anodized or otherwise cleaned. A plug (62 or 64) may be used to cover the hole (12). The type of plug chosen depends on the location of the hole. A heat reflective cover (110) is secured on the exterior surface (112) of the windshield (114) to prevent heat from entering through the windshield (114). The cover (110) has a heat reflective coating (116) such as a metallic silver coating. Cover (110) is secured in place with strips of hook and loop fasteners commercially available under the name of VELCRO® (120) that can be positioned for each individual vehicle (10). Cover (110) is then locked into position by closing the doors (132 and 134) over the wing flaps (122 and 126). Cover (110) is separated from the windshield (114) to provide a gap (A) between the windshield (114) and the cover (110).

13 Claims, 3 Drawing Sheets

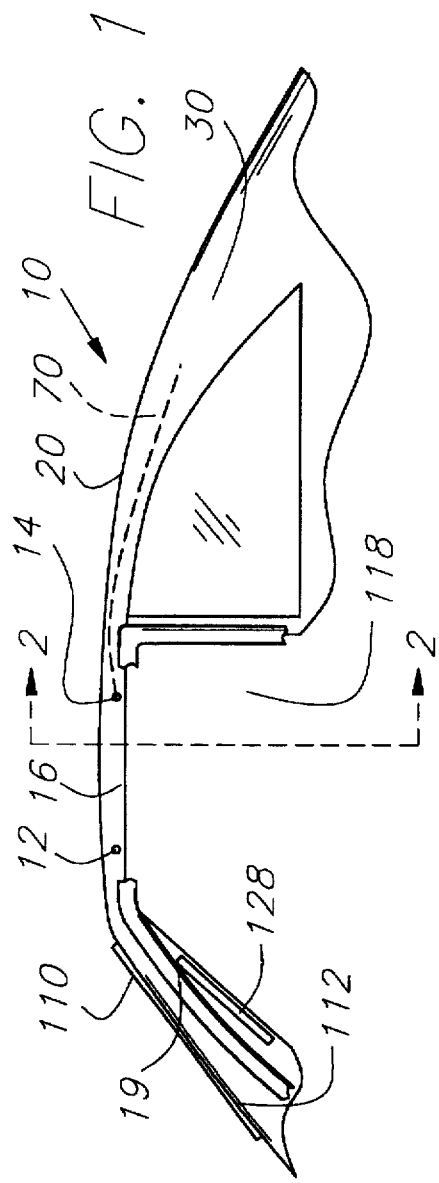
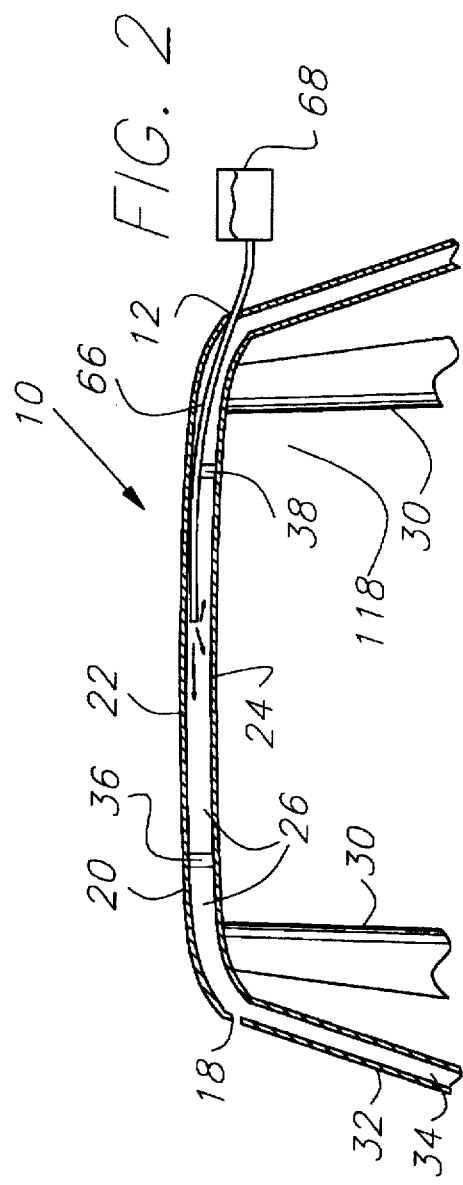

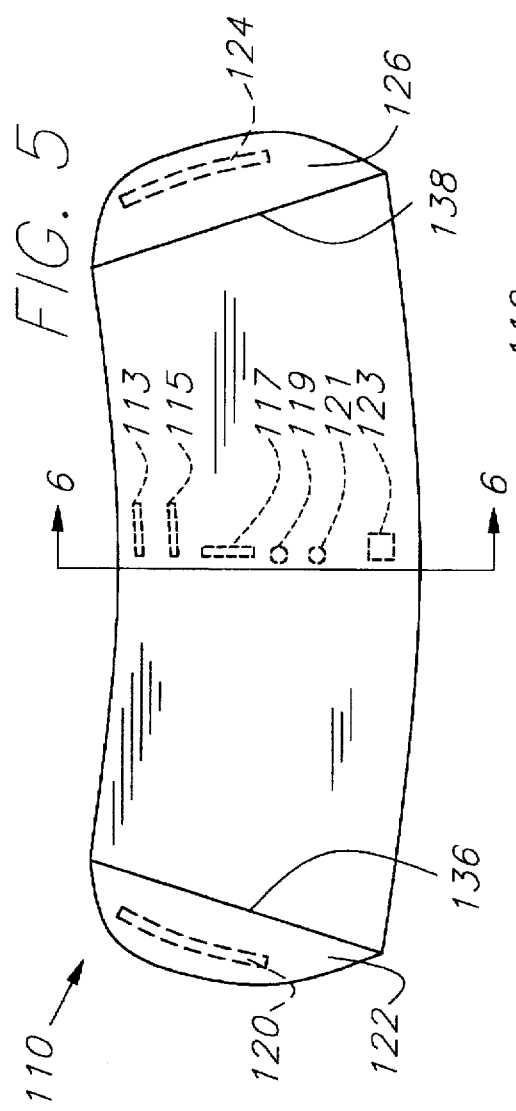
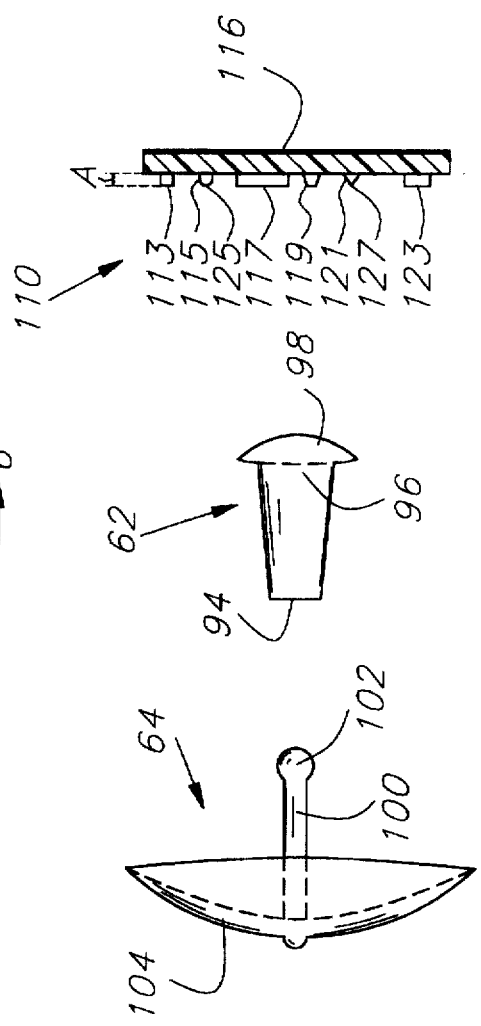
FIG. 5  FIG. 6  FIG. 7  FIG. 8

HEAT BLOCKER SYSTEM AND METHOD

BACKGROUND OF THE INVENTION

1. Field of the Invention

The present invention relates generally to automobile insulation systems and, more particularly, to apparatus and methods for blocking ultraviolet light and heat through the windows and roof cap of an automobile.

2. Description of the Background

Residents in southern climates are familiar with the rapid heat buildup that occurs in the driving compartment of an automobile or truck on hot sunny days. Within a short time, the passenger compartment may reach high temperatures that can cause damage to the interior components of the vehicle such as seats, steering wheels, dashboards, and the like. The hot temperature of the driving compartment causes discomfort to persons who enter therein and may burn exposed skin that touches metallic, leather, or plastic components. The heat absorbed by the components may require considerable air-conditioning time and energy to be cooled to a more comfortable level. If no air conditioning is available, the time of discomfort may be substantially extended. Due to the heat buildup, drivers will often seek shade under a tree if available. However, debris from birds or tree sap can damage the finish of the automobile if not washed off quickly.

Various insulating systems have been used heretofore including tinted windows and window shades. Tinted window insulating systems do not normally tint the windshield for safety reasons. Driving at night with a tinted windshield is considered too hazardous and some states prohibit tinting the windshield by law. Therefore, significant heat energy may flow through the windshield. Once this heat is inside the driving compartment, it is substantially trapped.

Various insulating systems also use a window shade positioned inside the driving compartment adjacent the windshield. In this position, the window shade reflects some heat energy back out the windshield. However, the heat that goes through the windshield causes a significant heat buildup within the driving compartment. The problem with such window shades is that the devices permit the sun and heat to travel through the front window but do not reflect all or even most of the heat back out through the windshield. Thus, the heat buildup due to heat energy flow through the windshield continues substantially unabated.

As well, heat enters the automobile compartment through the roof. How much heat enters through the roof depends largely on the area of the roof and the color of the roof. Darker roofs absorb much more heat than lighter colored roofs. The greater the area of the roof, the more heat will enter. Manufacturers construct vehicle roofs to have an outer shell exposed to the environment, an inner shell, and a headliner disposed on the passenger side of the inner shell. The outer shell and the inner shell define a volume therebetween that may also include supports to strengthen the roof. Vehicle roofs typically bend easily except near the supports. The headliner below the inner shell may include some soft insulative material. However, the thickness of the insulation is limited due to the need for maintaining as much headroom as possible. The heat insulative properties of the headliner are also secondary to the need for a soft or pliable surface that will absorb any passenger head contact.

Some vendors offer powered cooling elements for keeping the car temperature at a reduced level while parked. However, the heat flow through the windows and roof is quite large and requires considerable energy to dissipate. Therefore, powered cooling elements require significant energy to operate. As well, such cooling elements are expensive to purchase, operate, and/or maintain.

Consequently, there remains a need for a passive heat blocking system that offers a substantial reduction of the heat buildup at a low cost. Those persons who are skilled in the art have long sought and will appreciate the present invention that provides solutions to these and other problems.

SUMMARY OF THE INVENTION

The heat blocking system of the present invention may be adapted for operation with most automobiles, trucks, or other transportation vehicles. The system of the present invention provides for a method to insulate a vehicle having a windshield and an exterior panel. The exterior panel is formed of an outer shell and an inner shell that defines an exterior panel cavity therebetween. The method comprises forming one or more holes in the vehicle that are placed in a position of the vehicle frame in communication with the exterior panel cavity. A tubular member is preferably inserted through the holes and then extended into the exterior panel cavity. Insulation material, such as expandable liquid foam insulation, is injected through the tubular member into the exterior panel cavity.

An insulating cover is provided to have a size substantially matched to the windshield length and width. The insulating cover is mounted to substantially engage the length and width of a windshield of the vehicle on an exterior surface of the windshield. The cover is preferably accurately and quickly secured in place on the windshield with VELCRO® (a commercially available hook and loop fastener) and then fastened by closing the doors over a wing or tab portion that extends from the windshield portion of the cover. The cover is preferably offset from the window with spacers to prevent thermal transfer of the cover to the windshield.

Thus, in essence, the heat blocker system comprises providing for insulation material to block heat transfer through the windshield by blocking heat at an exterior portion of the windshield, forming a flow path in communication with the exterior panel cavity; and introducing insulating material into the exterior panel cavity through the flow path.

It is an object of the present invention to provide an improved vehicle insulation system.

It is another object of the present invention to provide an insulation system that may conveniently be used and/or installed to complement a window tinting system thereby greatly enhancing vehicle insulation.

It is yet another object of the present invention to provide an insulation system that reduces the heat buildup in a vehicle passenger compartment to limit the maximum temperature within the compartment.

A feature of the present invention is a method of injecting insulation into the roof of a vehicle either through the door jamb or directly through the top surface of the roof in taller vehicles such as vans.

Another feature of the present invention is a heat reflective cover easily securable to an exterior surface of the vehicle windshield.

An advantage of the present invention is a low cost highly effective insulation system for blocking heat buildup in a vehicle.

Another advantage of the present invention is a system that reduces corrosion, improves safety, and actually strengthens the structure of the vehicle.

Another advantage of the present invention is that heat is blocked from even entering the automobile compartment to prevent heat damage to interior components.

These and other objects, features, and advantages of the present invention will become apparent from the drawings, the descriptions given herein, and the appended claims.

BRIEF DESCRIPTION OF THE DRAWINGS

FIG. 1 is an elevational view of a vehicle indicating a tubular member insertion path through holes in the door jamb in accord with the present invention;

FIG. 2 is a cross sectional view along the line 2—2 of FIG. 1 that also depicts a tubular member extending between an external panel cavity and a liquid insulation application canister;

FIG. 5 is an isometric view of a heat reflective windshield cover in accord with the present invention;

FIG. 6 is a cross sectional view of FIG. 5 along the lines 6—6;

FIG. 7 is an elevational view of an interior plug in accord with the present invention; and FIG. 8 is an elevational view of an exterior plug in accord with the present invention.

Figure 3:
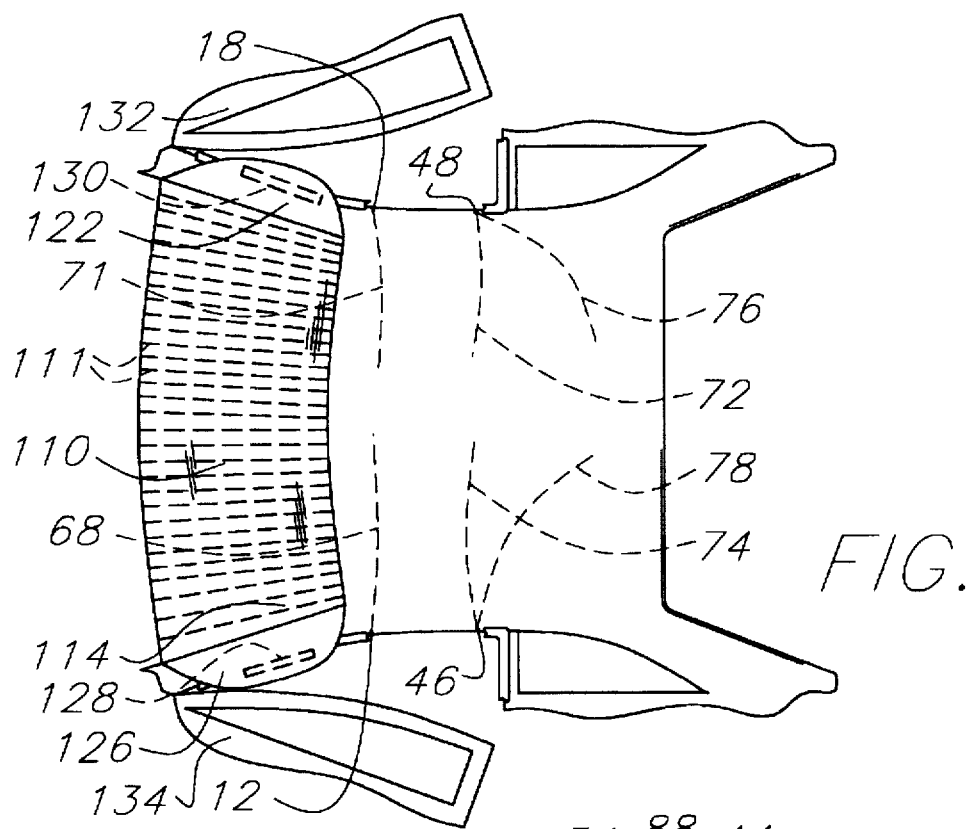
FIG. 3 is an elevational view of a vehicle showing tubular member insertion paths for an external panel cavity and a heat reflective external windshield cover in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Referring now to the drawings, and more particularly to FIG. 1 and FIG. 2, the general components of a heat blocker system, in accord with the present invention, are illustrated with respect to vehicle 10. While vehicle 10 is illustrated as an automobile, it will be understood that the present invention is also suitable for vans, pickups, trucks, and other vehicles. For some aspects of the present invention as discussed in more detail hereinafter, it is desirable that certain variations of the present invention be used to account for differences between, for instance, vans and passenger cars.

FIG. 1 shows insertion holes 12 and 14 that may be preferably drilled within door jamb region 16. To hide holes 12 and 14, it may be desirable to position the holes beneath rubber insulation member 19 that is shown as cut away for illustrative purposes. If necessary, holes 12 and 18 may be formed on opposite sides of vehicle 10 as shown in FIG. 2.

Figure 4:
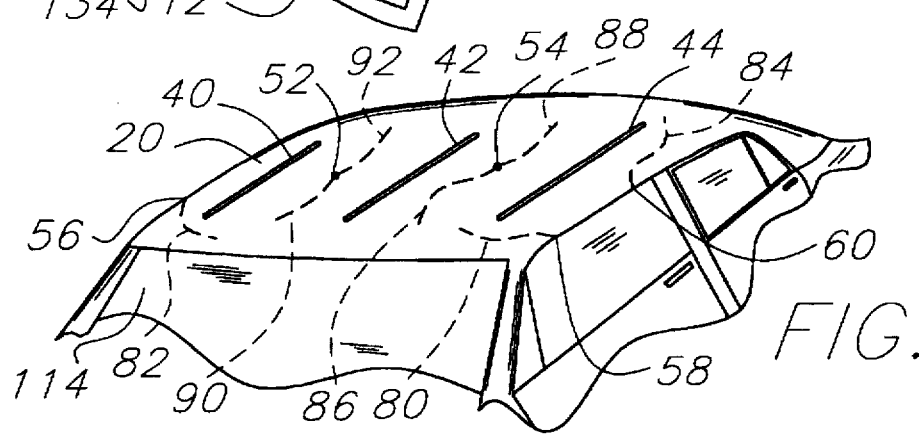
FIG. 4 is an isometric view of a vehicle showing tubular member insertion paths through holes in an outer shell of an external panel.

Vehicle 10 may be described in terms of exterior panels such as exterior roof panel 20 that comprises outer shell 22 and inner shell 24. Exterior roof panel cavity 26 is defined between outer shell 22 and inner shell 24. A headliner (not shown) is typically attached beneath inner shell 24 to prevent injury of a passenger due to hitting of inner shell 24. Vehicle 10 also comprises roof support panel 30 and side panel 32 that also define external panel cavities therein such as side panel cavity 34. Exterior roof panel 20 may also include corrugated supports 36 and 38 for providing strength to outer shell 22 and inner shell 24. In FIG. 4, corrugated supports 40, 42, and 44 are indicated for an exterior roof panel 20.

As part of the heat blocker system of the present invention, insertion holes may be drilled or otherwise formed in various positions throughout vehicle 10. Examples include insertion holes 12 and 14 as shown in FIG. 1, or holes 12 and 18 as shown in FIG. 2, or holes 12, 18, 46, and 48 as shown in FIG. 3, or holes 52, 54, 56, 58, and 60 as shown in FIG. 4. It can be seen from these figures that the insertion holes may be provided in many places over the body of vehicle 10. Preferably, the holes are placed in a position where they will not be visible. Tall vehicles such as vans may preferably have insertion holes in the roof portion where they will not be noticeable. The insertion holes are preferably sealed in the presently preferred embodiment, as discussed hereinafter, by interior plug 62 or exterior plug 64 shown in FIG. 7 and FIG. 8, respectively.

Referring again to FIG. 2, insertion holes such as insertion hole 12 are positioned so they are in fluid communication with an exterior panel cavity, such as roof panel cavity 26. A tubular conductor 66 is then provided between the insertion hole, such as insertion hole 12, to roof panel cavity 26. Sometimes, tubular conductor 66 must be routed around a support such as support 38. Often, the location of the supports may be determined visually or physically by pressing on outer shell 22 that typically bends easily. Once the panel is injected with liquid expandable insulation material 68, the panel or roof is greatly reinforced and no longer bends.

Tubular conductors, such as tubular conductor 66, may be positioned in various positions to reach various panel cavities as wanted. Tubular connectors may be used simultaneously or may be used individually. For instance, in FIG. 1, tubular conductor 70 is positioned within roof support panel 30. In FIG. 3, several different tubular conductors are shown in different flow paths. Tubular conductors 68 and 71 are directed to a forward portion of roof panel cavity 26. Tubular conductors 72 and 74 are directed toward a central portion of roof panel cavity 26 and then redirected, as suggested by lines 76 and 78 to a rearward portion of roof cavity 26.

The diameter of the tubular conductor may vary but is not required to be particularly large—generally in the range of about 0.25 inches plus or minus about an eighth of an inch. However, this will vary depending on the type of connections necessary, hole sizes, and the like. Preferably tubular members, such as member 66, are malleable enough to be shaped and then stiff enough to be extended through the panel to the desired position in the panel cavity. Copper tubing is useful for this purpose.

Generally, the length will be adjusted as necessary although a typical range may be from two to six feet. Copper tubing is easily cut to a desired length if necessary for a particular application. Thus, as shown in FIG. 2, one end of a copper tube may be connected to a canister of liquid foamable insulation material under pressure. The insulation material is injected at the desired location in roof panel cavity 26 until a substantial portion of the cavity is filled with insulation as discussed hereinafter.

Preferably, a liquid polyurethane resin under pressure is used for injectable insulation material 68. Cans of this material are readily available at hardware supply stores under different brand names and may be purchased at low cost, especially in bulk. Several cans will insulate a roof panel thereby providing insulation at a low cost. After drying, this material is a flame retardant and anticorrosive so that it provides additional protection to the roof of vehicle 10. It should be noted that flame must be kept away during installation since the carrier or gas used with the liquid insulation material is flammable. The material expands quickly upon exposure to air.

The location of the insulation material 68 during injection is readily ascertainable by the noise that it makes as it flows and expands. If needed, the location of flow can be traced using a low cost plastic stethoscope. A weep hole may also be provided to conduct excess liquid foam from the cavity. A check rod may also be inserted to verify the positioning of the insulation material, if desired. Once the insulation material expands and hardens, then the roof actually becomes greatly reinforced.

Sometimes, especially for very large roofs such as found on vans, the auto manufacturer will provide many corrugated supports as indicated in FIG. 4 by supports 40, 42, and 44. In such cases, routing tubular conductors around the supports from the door jamb as shown by indicated tubular members 80, 82, or 84 may be desirable. While the location of supports can generally be determined visually or by pressing on the flexible outer shell 22 before injection, the location of such supports may also be determined from manufacturer specifications. Where the roof is high so that holes will not be readily visible, the holes may be drilled directly through outer shell 22 as are holes 52 and 54. Tubular members as indicated by lines 86, 88, 90, and 92 may then be used to transport the insulation material over the length of the roof that may be relatively long as compared with passenger vehicles. Occasionally, it may also be desirable to have a short tubular member or otherwise inject the insulation directly into the panel cavity from the source of the insulation such as a pressurized canister of insulation material.

After injection is complete, the tubular members, such as tubular conductor 66 shown in FIG. 2, are preferably withdrawn. The hole formed may be anodized and painted if needed. A corrosive inhibitor may be placed over the hole and a plug may be used to seal the hole. For the door jamb or other holes where visibility is not a problem, a small plug such as plug 62 may be hammered into place. The presently preferred plugs are made of a noncorrosive material such as plastic but may be formed of other materials, if desired. The taper on the plug will preferably run from about 0.25 inches at end 94 to about 0.375 inches at portion 96 adjacent head 98. The taper effectively secures plug 62 in a 0.25-inch hole and the sizes may be readily adjusted if other size holes are used. The insulation material will also adhere to the plug to secure it in place. The plugs may be painted to match the body color, if needed.

Larger plugs such as plug 64 are preferably used on the top of roofs to plug holes in outer shell 22 such as holes 52 and 54 of FIG. 4. Plug 64 is preferably in the range of about one inch in diameter plus or minus about one half inch although it may be larger or smaller than this as desired or as necessary. Preferably plug 64 will be matched in color to vehicle 10. Paint for different manufacturers is readily available to provide an excellent color match. Plug 64 has a seal pin 100 that may have an enlarged, preferably malleable head portion 102 for securing plug 64 in the desired hole. The smoothly rounded and/or tapered edges 104 of plug 64 blend gently into the contour of the roof so as not to be noticeable. Plug 64 is preferably made of a noncorrosive pliable material such as plastic so that it can be compressed against outer shell 22. It is streamlined to prevent any wind noise. In general, seal pin 100 will be about 0.75 inches long plus or minus about one-half inch. Pin 100 may be tapered as wanted although seal pin 100 may be varied in shape as desired, this being merely a presently preferred embodiment of a seal plug.

In a preferred embodiment of the present invention, the heat blocker system utilizes a heat reflective cover 110 mounted to exterior surface 112 of windshield 114 (see FIG. 1 and FIG. 4). By placing cover 110 on the exterior of windshield 114, heat energy is prevented from ever even entering the passenger compartment, such as passenger compartment 118. Because the heat energy does not enter passenger compartment 118 through windshield 114 in the first place, energy does not need to be reflected back out of the compartment, as with internally disposed sun shades. Cover 110 preferably is made with or includes dowels or rods 111 to provide air gap A (see FIG. 6) between the planar portion of cover 110 and windshield 114. Gap A virtually eliminates any heat transfer from cover 110 to windshield 114 due to physical contact therebetween.

Cover 110 is shown in FIG. 5 in some detail. A variety of types of standoffs such as, for instance, standoffs 113, 115, 117, 119, 121, 123 may be used to provide air gap A. Standoff rod 113 has a square cross section and standoff rod 115 has a rounded cross section (see FIG. 6). Standoffs may be oriented in various directions and patterns. It is necessary that the standoffs do not prevent the required flexibility of cover 110 for engaging windshield 114. Vertically oriented rods 111 are the presently preferred standoffs. Smaller pins or feet such as feet 119, 121, and 123 may also be used. The standoffs may be made of a material that is different from that of cover 110 or the standoffs may be molded in one piece with cover 110. Thus, the standoffs may be the same material as cover 110 and be provided by a molding process. The standoffs could be formed into a separate insulative layer to be attached to cover 110 and be substantially sheet-like.

A cross section of cover 110 is shown in FIG. 6. The shape of the standoffs may be chosen to further limit heat transfer. For instance, a preferably rounded surface 125 of rod 115 or pointed surface 127 of pin 121 may be used to further limit heat flow through physical contact. The width of gap A may be adjusted as wanted. It may range from a small distance, such as about one-sixteenth or one thirty-second inches, to a relatively large distance, such as about an inch or two. Preferably, gap A is chosen in accord with materials used for flexibility, fit, and so forth and is preferably in the range of about one-eighth to three-eights inches wide. However, it will be understood that there are no restrictions on the width of gap A so long as the necessary function is performed.

Cover 110 has a height and a width that are preferably substantially matched to windshield 114 of vehicle 10 to thereby thermally isolate windshield 114. Additional height and width, except as discussed below for mounting purposes, is not necessary or particularly desirable as it provides additional cost, storage, and usage problems without additional benefit.

In one presently preferred embodiment, cover 110 contains or consists of a woven material such as fabric with a tight weave to be more dense. However, in another embodiment, cover 110 may be made from plastics, elastomerics, combinations thereof, or virtually any other suitable material as will be known to those skilled in the art. Cover 110 preferably includes a heat reflective coating 116 on one side that blocks heat energy including UV and sunlight. Alternatively cover 110 may be comprised of material that is already a heat reflective color. Preferably, cover 110 is weather resistant and mildew resistant to be durable and long lasting. As well, cover 110 preferably has sufficient thickness or strength to resist tearing, fatigue from folding, and the like. Of course, for lower quality applications less expensive material could be used with some good effect according to the teachings of the present invention.

A VELCRO® (commercially available hook and loop fastener) kit is used with cover 110 to mate cover 110 with windshield 114. Although other fastener means could be used to provide for a quick and easy way to custom match cover 110 to a particular vehicle 10, the VELCRO® kit is a particularly simple way to accomplish this. Adhesive VELCRO® strips 120, 124 may be placed on each wing flap 122, 126 for mating with a matching adhesive VELCRO® strips such as strip 128, 130 on each side of the vehicle 10. Adhesive strips 128 and 130 may be placed on opposing vertical roof support struts, door jambs, or elsewhere conveniently adjacent windshield 114. In a preferred embodiment, wing flaps 122 and 126 are comprised of a clear or substantially clear material to allow an operator or user to be able to look through the wing flaps. Because of the usage of clear material, the mating VELCRO® strips can then be visually mated with respect to each other from the outside of the wing flaps and without having to look at the underside of the wing flaps. In this manner, cover 110 is quickly, accurately, and securely positioned over windshield 114. To lock cover 110 in place, and actually take out any slack in cover 110, doors 132 and 134 are closed over wing flaps 122 and 126 substantially in the region of lock-in lines or creases 136 and 138. After the doors are closed, cover 110 is securely fixed and cannot be moved. If wanted, tabs or other extensions rather than flaps 122, 126 could be used although flaps are the presently preferred embodiment of the invention due to their convenience in use with the VELCRO® (commercially available hook and loop fastener) kit. As well, self coiling devices (not shown) and the like could be used with the present invention as wanted for positioning cover 110 onto windshield 114.

The foregoing disclosure and description of the invention are illustrative and explanatory thereof, and it will be appreciated, by those skilled in the art, that various changes in the size, shape, and materials and also in the details of the illustrated construction or combinations of features of the various insulative elements and methods may be made without departing from the spirit of the invention.

What is claimed is:

1. A method for insulating a vehicle, said vehicle comprising a windshield and an exterior panel, said exterior panel comprising an outer shell and an inner shell to define an exterior panel cavity therebetween, said method comprising:

forming at least one hole in a door frame of said vehicle such that said at least one hole is in communication with said exterior panel cavity;

inserting a tubular member through said at least one hole;

extending said tubular member into said exterior panel cavity; and supplying insulation material through said tubular member into said exterior panel cavity.

2. The method of claim 1, further comprising:

reflecting heat energy away from said windshield with a cover that has a reflective section and has a substantially transparent end flap.

3. The method of claim 2, further comprising:

closing at least one door of said vehicle over said substantially transparent end flap to secure said cover to said windshield.

4. The method of claim 1, further comprising:

mounting a cover to substantially engage a length and a width of said windshield of said vehicle; and providing said cover with a substantially transparent flap portion that extends past said length.

5. The method of claim 4, further comprising:

securing said cover to said windshield using a hook and loop fastener that connects with said substantially transparent flap portion.

6. The method of claim 1, further comprising:

removing said tubular member from said hole, and plugging said hole in said door frame.

7. The method of claim 1, further comprising:

forming another hole through a roof portion of said exterior panel.

8. The method of claim 1, further comprising:

extending said tubular member into a vehicle roof portion of said exterior panel.

9. A method for insulating a vehicle, said vehicle comprising a windshield and an exterior panel, said exterior panel comprising an outer shell and an inner shell to thereby define an exterior panel cavity therebetween, said method comprising:

providing a cover having a planar portion substantially matched to a windshield length and a windshield width of said windshield;

mounting said cover on an exterior surface of said windshield to substantially engage said windshield along said windshield length and said windshield width;

providing an extended portion of said cover that is extendable past said windshield length; and forming said extended portion of said cover from a substantially clear material.

10. The method of claim 9, further comprising:

providing a hook and loop fastener for securing said extended portion of said cover in a door jamb region of said vehicle.

11. The method of claim 9, further comprising:

forming a flow path in communication with said exterior panel cavity, and filling at least a portion of said exterior panel cavity with foamable insulation material through said flow path.

12. The method of claim 9, further comprising:

forming a gap between said cover and said exterior surface of said windshield over a substantial area of said windshield.

13. A method for insulating a vehicle, said vehicle comprising a windshield region and an outer panel, said outer panel comprising two shell members including an outer shell and an inner shell, said outer shell and said inner shell each having a substantially similar shape to thereby define a panel cavity therebetween, said outer shell being an outer surface of said vehicle, said method comprising:

forming at least one hole in at least one of said two shell members such that said hole is in communication with said panel cavity and is in a door frame of said vehicle;

inserting a tubular member through said at least one hole;

extending said tubular member into said panel cavity through said at least one hole in said at least one of said two shell members; and supplying insulation material through said tubular member into said panel cavity.

* * * * *